(12) United States Patent
Wang

(10) Patent No.: US 8,909,617 B2
(45) Date of Patent: Dec. 9, 2014

(54) SEMANTIC MATCHING BY CONTENT ANALYSIS

(75) Inventor: Dong Wang, Beijing (CN)

(73) Assignee: Hulu, LLC, Santa Monica, CA (US)

( * ) Notice: Subject to any disclaimer, the term of this patent is extended or adjusted under 35 U.S.C. 154(b) by 343 days.

(21) Appl. No.: 13/014,491

(22) Filed: Jan. 26, 2011

(65) Prior Publication Data

US 2012/0191692 A1    Jul. 26, 2012

(51) Int. Cl.
*G06F 7/00*    (2006.01)
*G06F 17/30*    (2006.01)

(52) U.S. Cl.
CPC .................................. *G06F 17/3089* (2013.01)
USPC ............................ 707/709; 707/729; 709/232

(58) Field of Classification Search
None
See application file for complete search history.

(56) References Cited

U.S. PATENT DOCUMENTS

| | | | | |
|---|---|---|---|---|
| 5,223,902 A * | 6/1993 | Chodak et al. | ................... | 399/97 |
| 5,384,175 A * | 1/1995 | Kojima et al. | ............. | 428/840.3 |
| 5,772,846 A * | 6/1998 | Jaffee | ............................ | 162/145 |
| 5,869,819 A * | 2/1999 | Knowles et al. | .............. | 235/375 |
| 5,903,892 A * | 5/1999 | Hoffert et al. | .......................... | 1/1 |
| 5,926,180 A * | 7/1999 | Shimamura | ................... | 715/739 |
| 5,929,850 A * | 7/1999 | Broadwin et al. | ............ | 725/110 |
| 5,983,176 A * | 11/1999 | Hoffert et al. | ................. | 704/233 |
| 6,012,068 A * | 1/2000 | Boezeman et al. | ................... | 1/1 |
| 6,115,035 A * | 9/2000 | Compton et al. | ............. | 715/717 |
| 6,138,156 A * | 10/2000 | Fletcher et al. | ................ | 709/224 |
| 6,185,588 B1 * | 2/2001 | Olson-Williams et al. | ... | 715/236 |
| 6,249,810 B1 * | 6/2001 | Kiraly | ............................. | 709/217 |
| 6,263,371 B1 * | 7/2001 | Geagan et al. | ................ | 709/231 |
| 6,675,174 B1 * | 1/2004 | Bolle et al. | ............................. | 1/1 |
| 6,850,252 B1 * | 2/2005 | Hoffberg | ........................ | 715/716 |
| 6,904,408 B1 * | 6/2005 | McCarthy et al. | ................ | 705/2 |
| 7,043,433 B2 * | 5/2006 | Hejna, Jr. | ....................... | 704/270 |
| 7,343,081 B1 * | 3/2008 | Austin | ........................... | 386/200 |
| 8,356,247 B2 * | 1/2013 | Krassner et al. | .............. | 715/234 |
| 2005/0193010 A1 * | 9/2005 | DeShan et al. | ............. | 707/104.1 |
| 2007/0286499 A1 | 12/2007 | Freiburg | | |
| 2009/0141939 A1 | 6/2009 | Chambers | | |
| 2009/0150406 A1 * | 6/2009 | Giblin | ............................ | 707/10 |
| 2010/0185646 A1 | 7/2010 | Yang | | |
| 2010/0287159 A1 * | 11/2010 | Abajian et al. | ................ | 707/723 |
| 2012/0084133 A1 * | 4/2012 | Ross et al. | .................. | 705/14.27 |

OTHER PUBLICATIONS

International Search Report and Written Opinion from International Application No. PCT/US2012/022415, mailed May 23, 2012.

* cited by examiner

*Primary Examiner* — Daniel Kuddus

(57) ABSTRACT

A method, apparatus, system, article of manufacture, and computer readable storage medium provide media content. A web page context for a web page is determined and stored in a database. One or more media content files are analyzed to extract information that is stored in the database. The information is compared to the web page context. A matching media content file is determined from the one of the one or more media content files that matches the web page context based on the comparison. The matching media content file is then provided (e.g., to an internet portal web site).

28 Claims, 4 Drawing Sheets

SEMANTIC MATCHING BY CONTENT ANALYSIS

BACKGROUND OF THE INVENTION

1. Field of the Invention

The present invention relates generally to delivering relevant media content for web pages, and in particular, to a method, system, apparatus, and article of manufacture for rapidly providing such relevant media content.

2. Description of the Related Art

Media content such as audio-video is often delivered to end-users via web sites. Based on the context in which the media content is presented on the web site, it is often desirable to present customized or relevant media content. To provide customized/relevant media content, prior art implementations require manual configuration by the web site owner as well as the manual determination of relevant content to put into the web site. Such practices are time consuming, impractical, fail to account for changes in the hosting web site, and are prone to error. These problems may be better understood with a description of prior art media content delivery mechanisms.

Media content can be delivered to Internet users through a variety of mechanisms. In one example, a media content web site (e.g., Hulu.com™) may directly stream content to users. In another example, internet portal web sites (e.g., Yahoo™, news web sites, Google™, etc.) may (1) link to, or (2) embed media content (e.g., videos) in their web pages.

Links (e.g., a uniform resource locator—URL) may be displayed on the webpage, and upon selecting a particular link, either: (1) the user may be transported to the URL location where a new webpage is displayed containing the content, or (2) the media content may be displayed to the user within the web page.

With media content that is embedded into the webpage, the location (i.e., URL or local file location) of the media content may be specified within an appropriate command or tag (e.g., hyptertext markup language [HTML], or extensible markup language [XML], Java™, etc.). For example, the <OBJECT> tag and/or the <EMBED> tag may be used to embed content into a webpage. When embedding content using such code/tags, the code must specify an object type (e.g., a plug-in for a media content player) necessary to display/play the content within the web page as well as the location of the media content to be played using the plug-in. Further, the size of the object type may also be specified. Thus, whenever media content is embedded, both the media player/object and the specific location of the media content that is embedded must be specified.

Internet portal web sites often utilize or embed media content from third party media content hosts/owners (e.g., Hulu™). Such content may be emailed by the third party media content host/owner to the internet portal web site. Alternatively, the internet portal web site may simply specify the location of the media content that may be hosted by the third party. Thus, once embedded or linked to, when a user clicks on a thumbnail or link, the media content may be retrieved from the appropriate location and played within the embedded media player on the same web site/page. Alternatively, a new window, in which the media content is displayed, may open for the user.

It is often desirable for the embedded media content to be relevant to, or related to, the information presented in the web page. For example, if the web page contains a news article about an actress that has recently passed away, it may be desirable to link to or embed a clip from a movie starring the actress. In another example, if the web site describes how to cook a certain recipe, it may be desirable to link to or embed a media clip demonstrating a chef following the recipe or a clip about the recipe's author. To provide such content, the prior art requires the manual entry by a programmer of the media content location in the web page. Further, determining which content to place in the web page is a manual operation.

In addition to the above, internet portal web sites (e.g., news web sites or other websites that users access for information, content, data, etc.) may often change their content. For example, recent news items may be displayed and changed on an hourly, daily, and/or weekly basis (e.g., the home page of a news website). With the frequent changes of the web site/page, it is desirable to update and modify the linked/embedded media content on the web site/page. However, as described above, the particular media content (i.e., the location and method of playing the content) that is embedded has to be manually programmed by the web site host/designer. Thus, if a news article describes a grand opening of a large department store with celebrities in attendance, the third party may have to manually embed a link to videos about the department store location, the particular celebrity, etc. Such manual operations are inefficient, and often not possible due to the frequency of changes.

Further to the above, it is desirable to analyze the content of a web site/page in order to find relevant media content that should be embed into the web site/page. For example, if a car or face is found in an image displayed on a web site/page, it may be desirable to embed information or a clip about the car or face. Further, if an event is identified in a media clip (e.g., a person running or sitting), information about the event is desirable. In this regard, internet portal web sites may request a content provider to analyze and provide relevant media content for embedding into the web page. Many prior art content analysis systems exist in the prior art. However, the ability to utilize the information obtained from a content analysis system to provide/deliver relevant additional media content is unavailable in the prior art. Further, the ability to perform such operations dynamically, in real-time is also unavailable in the prior art.

In view of the above, it is desirable to dynamically perform content analysis and to utilize the results of such content analysis to dynamically embed/link media content on a web site/page.

SUMMARY OF THE INVENTION

To overcome the problems of the prior art, embodiments of the invention automatically analyze video to identify content of interest and populate a database with content. A media server crawls the web (including portals such as internet news portal web sites) and identifies information in those web sites, and in particular, changes to those websites since the previous crawl.

Metadata obtained from a content analyzer (for the media content) is compared with information crawled from customers as web pages of interest. Media programs that might be of interest at those web pages are identified and made available to the web page.

The information input for matching can be pure content analyzer provided, or can be augmented by the user generated metadata of tags/reviews. Meanwhile, the crawler can use web pages and knowledge bases from different sources to better match the current news items (or other forms of textual content). A matching engine/machine considers entities from both textual and visual content and connects the entities to recognize events. Thereafter, the matching engine may include both entity matching and event matching (e.g., an entity relation based match).

As an example, a media program may include an image of an actress. The media program can be processed by the content analyzer that identifies the actress being depicted in the film. A third party such as an internet news portal web site could update their web page to include news that the actress has died. Web crawlers note that a change has happened in the web page, and that the change is the death of the actress. A matching engine matches the metadata from the web site with the metadata from the content analysis, and provides a link to the third party so that they may include associated video in a link or as embedded video.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
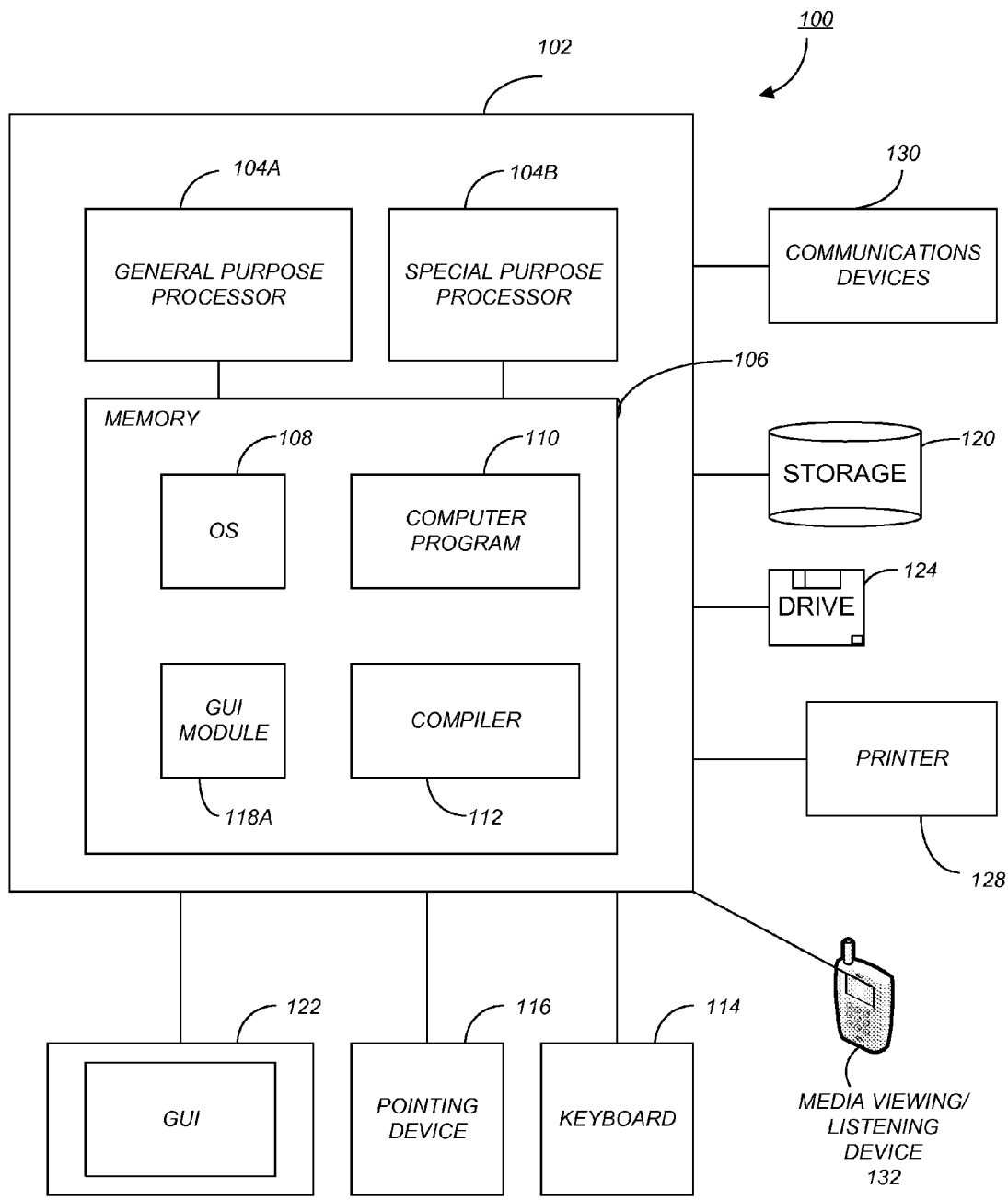
FIG. 1 is an exemplary hardware and software environment 100 used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a cursor control device 116 (e.g., a mouse, a pointing device, pen and tablet, etc.) and a printer 128. In one or more embodiments, computer 102 may be coupled to a media viewing/listening device 132 (e.g., an MP3 player, iPod™, Nook™, Kindle™, portable digital video player, cellular device, personal digital assistant, iPad™, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Although the term "user computer" or "client computer" is referred to herein, it is understood that a user computer 102 may include portable devices such as cell phones, notebook computers, pocket computers, or any other device with suitable processing, communication, and input/output capability.

Figure 2:
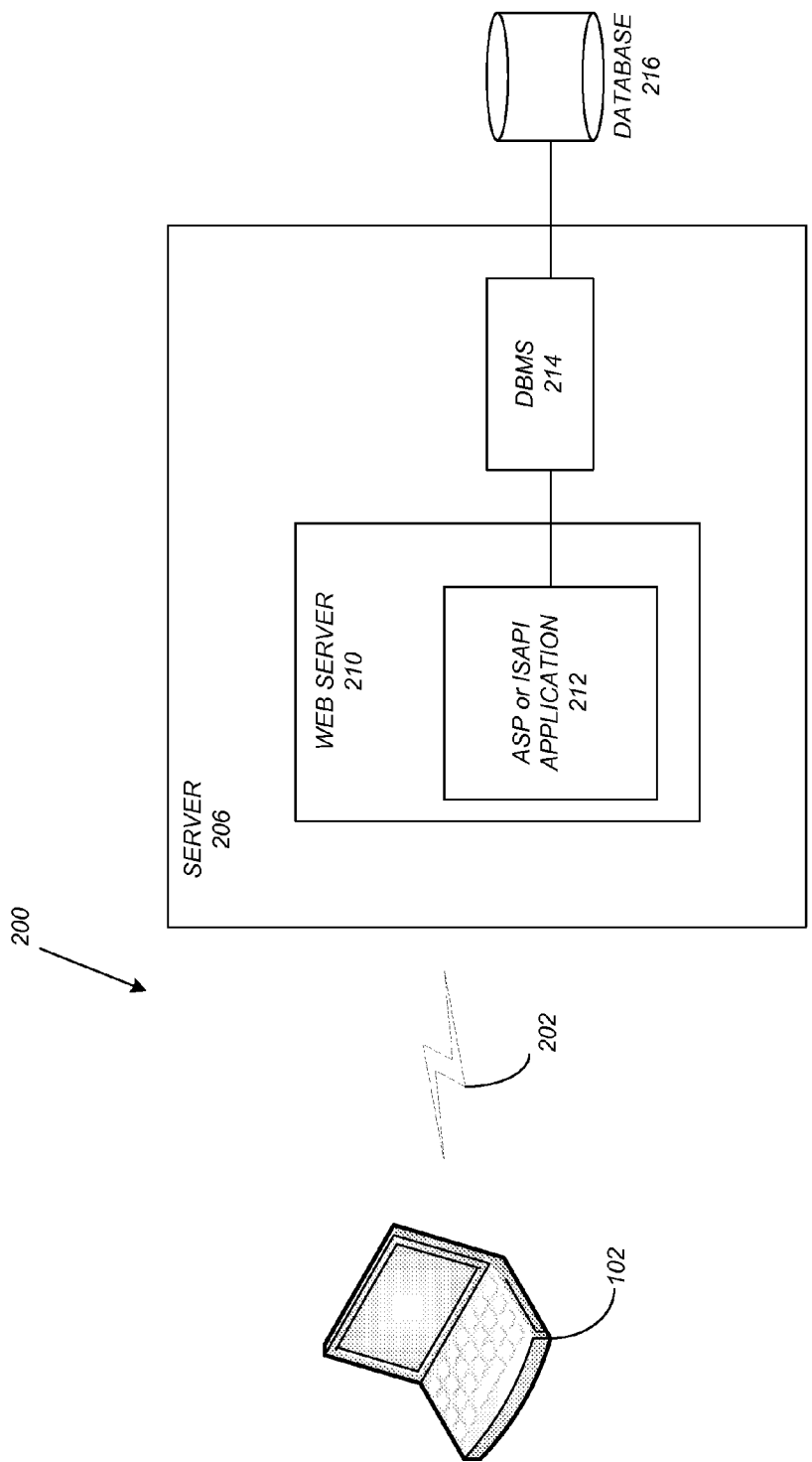
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug-in or ACTIVEX™ control of a web browser. In embodiments of the invention, such a plug-in may provide a media content viewer that provides the ability for the user to view audio-video content, programming, etc. either as part of a web page or in a separate media viewing browser. Such content may be streamed across the Internet, downloaded and viewed, or a combination of both (where some media content may be locally cached). Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 208-218 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include portable devices such as cell phones, notebook computers, pocket computers, or any other device with suitable processing, communication, and input/output capability.

Of course, those skilled in the art will recognize that any combination of the above components, or any number of different components, peripherals, and other devices, may be used with computers 102 and 206.

Software Embodiments

Embodiments of the invention are implemented as a software application on a client 102 or server computer 206. In one or more embodiments of the invention, a user/client 102 views media content (e.g., audio-visual programs such as television shows, movies, etc.) on a web site (e.g., a news portal web site) or via an online service (e.g., Hulu™) that transmits (e.g., via unicast, multicast, broadcast, etc.) such content. The website may further obtain the content from an online service or content provider (e.g., Hulu™). The web sites may also offer different levels of service for those users that elect to register or sign-up. For example, one level of service may offer basic low resolution media content with advertising, another level of service may offer the same resolution without advertising, a third level of service may offer high definition media content, and/or a fourth level may offer the ability to stream the content to a television, mobile device, or computer. Any combination of services/content may be offered across one or more levels.

As described above, internet portals may either link to or embed videos/media content in their web pages to provide additional content related to the information presented in the web page. Such internet portals often request that a media content provider deliver (e.g., transmit, email, provide a link to, etc.) media content that is relevant for a particular web page. Once received, the internet portal then has to manually insert the link/media content into the web page. In addition, the media content provider often waits for a request from an internet portal before analyzing the web page/site in question to determine the media content that is relevant.

Figure 3:
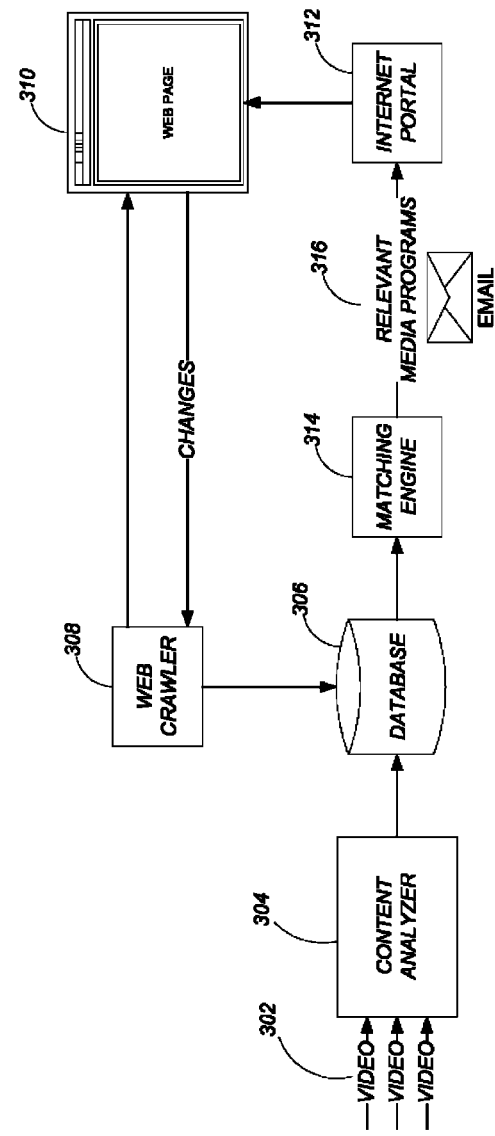
FIG. 3 illustrates an overview of a system utilized to determine and provide relevant media content in accordance with one or more embodiments of the invention.

To overcome such problems, embodiments of the invention automatically (e.g., without additional user input) determine and provide relevant media content (or a link to relevant media content) to an internet portal. FIG. 3 illustrates an overview of a system utilized to determine and provide relevant media content in accordance with one or more embodiments of the invention. Video/media content 302 is analyzed using a content analyzer 304 and the extracted information is stored in database 306. In addition, a web crawler 308 is used to determine the context of a web page 310 (e.g., of an internet portal 312). The context of the web page 310 is compared to information regarding the media content 302 by matching engine 314. Based on the comparison, the best match between the web page 310 and media content 302 is found and the matching/relevant media content 316 is provided to the internet portal (e.g., via email or via a link).

Various methodologies may be utilized to gather the information about the web page 310 and the media content 302 and to perform the comparison 314. The description herein discloses exemplary methods and tools that can be used in this regard.

Web Page/Site 310 Content Analysis

In one or more embodiments of the invention, media content providers web crawl 308 (including crawling internet portal web sites 312) and perform automated content analysis of found web pages/sites. The automatic analysis may be performed without a request from the internet portal web site 312 and without any additional user input. Based on the web crawling 308, the found content is analyzed and information gathered from the analysis is extracted and may be stored in a database 306.

Further, changes to web sites 310 since a previous crawl may also be identified. Various different web crawlers 308 may be used to locate web pages/sites 310 and to determine if changes have been made on a specific web page/site 310. For example, open-source web crawlers 308 such as crawler4j™, DataparkSearch™, and/or Heritrix™ web crawlers may be utilized to find/locate web pages/sites 310 and determine new content on such pages.

Once a web page/site 310 has been located and new material identified, the content on such a page 310 is analyzed to determine the context of the page 310. Numerous different types of information may be utilized to determine the context of the web page/site 310. For example, metadata may be directly provided in the found/located web sites 310 (e.g., via tags or information of the page itself). In this regard, user generated metadata of tags/reviews may be used.

Alternatively (or in addition), the content of the web page 310 may be analyzed. Existing content analysis applications 304 may be used to perform the analysis. The content analysis may include both a text-based analysis and/or an image-based analysis. Thus, the content analysis may be augmented by the user generated metadata (or vice versa). As described above, matching engine/machine 314 considers entities from both textual and visual content and connects the entities to recognize events. Thereafter, the matching engine 314 may include both entity matching and event matching (e.g., an entity relation based match).

Sometimes the entity (from the textual/visual content) may be ambiguous and refers to/includes multiple entities. Disambiguation may be performed based on the context of the relationships among the entities. Such disambiguation can be done via building a large ontology of the entities, with the huge knowledge database available (e.g., Wikipedia™). In one or more embodiments, the most probable meaning of one ambiguous entity can be selected with the context determined by other entities and the categorization result.

With respect to the text-based analysis, the content analysis may search for the text on the page 310 and analyze such text to determine the context of the web site 310. Such text may include tags (e.g., HTML or XML) as well as text displayed in the web page 310. As an example, for the text analysis, SVM (support vector machines) based text categorization may be utilized. Such a categorization assigns semantic predefined categories to found text (e.g., text found within the web page 310 or in tags/metadata associated with the web page 310). Based on the assigned categorization of text within a web page 310, the general category/topic/context of the web page 310 may be determined. Categories may include entertainment (e.g., with subcategories for movies, shows, celebrities, etc.), politics, science/technology, sports, health, military, and education. A hierarchical type schema may be utilized for categories and subcategories in order to improve the efficiency and accuracy of the text-based analysis.

In one or more embodiments, the text analysis may first perform tf-idf (term frequency-inverse document frequency) feature extraction. Tf-idf is a weight often used in information retrieval and text mining—it is a statistical measure used to evaluate how important a word is to a document in a collection. The importance increases proportionally to the number of times a word appears in the document but is offset by the frequency of the word in the collection. After determining/extracting the relevant features/text, a vector space model similarity calculation can be performed. The vector space model is a model for representing text documents as vectors of identifiers, such as, for example, index terms. If a term occurs in a document, the value/weight for the vector (that represents that document) is non-zero. The tf-idf feature extraction determined weight may be used as the value/weight for each vector/term in the vector space model. Once the model has been created, a multi-class SVM may be used to train the model. Thereafter, the trained model may be automatically applied when new text arrives.

The image-based analysis may analyze images within a web page 310 for particular events, people, places/locations, etc. A similar categorization of the images may also be utilized to determine the general context/topic of the web page 130. Image analysis techniques such as face recognition and scene analysis can be adopted to enhance the text analysis results. Similarly, near duplicate image analysis can be leveraged as existing image sharing sites (e.g., Flickr™) have huge amounts of data including the tagging information for many images.

Once the web page 310 content has been analyzed, the extracted/resulting information may be stored in database 306 (e.g., a relational database).

Media Content 302 Analysis

The media content provider may further automatically analyze 304 media content 302 to identify/categorize content. Such content 302 and the categorization of the content 302 may be used to populate the database 306. Similar to the content analysis of the web sites/pages 310, the content analysis 304 of the media content 302 may search for text, people, images, events, etc. and may tag, associate, or store metadata (in the database 306) for the media content that provides particular attributes for the content. Thus, as illustrated in FIG. 3, a content analyzer 304 may be used to analyze the media content/video 302 and store the results in database 306.

The content analyzer 304 may be used to analyze text in the media content (e.g., similar to the methods described above for the web page 310 content analysis). The media content 302 may further contain closed captioning data. Such closed captioning data may be analyzed 304 using the SVM based text categorization as described above.

If closed captioning information is missing, noisy speech recognition may be utilized. In this regard, the media content 302 may contain audio that includes oral speech and noisy speech recognition technology (e.g., the CMU [Carnegie Mellon University] Sphinx Recognition Toolkit™ application) may be utilized by the content analyzer 304 to extract the keywords from the speech. In this regard, keywords such as personal names, institution names, etc. may be identified and used during the matching 314. Further, the number of occurrences of a particular keyword (e.g., person, institution, time, etc.) may be used to further identify relevant content.

The media content 302 may also contain various images. To determine the context and persons in such images, facial recognition applications may be utilized. For example, content analyzer 304 may utilize face detector engines (e.g., the OpenCV™ face detector) combined with standard procedures of face landmark detection and face alignment. After detecting faces/landmark and alignment, facial recognition may be performed. For pure recognition, various recognition applications may be utilized (e.g., the Picture Motion Browser™ application from Sony™)

The media content 302 also may receive user comments and tagging. This kind of data is complimentary to categorical metadata by the text and image analysis produced above and integrated. The user generated metadata may be noisy, thus a further filtering may be necessary. Such filtering may include analyzing the user's history data and/or validating the data across users.

The categorization of the media content 302 and/or web page 310 may further rely on the frequency with which a keyword, image, etc. is found. Thus, the more often a particular keyword is located, the higher likelihood the media content 302/web page 310 will be placed into a category based on that keyword. The keywords most recently used may also be assigned an increased weight that is used for classification/categorization purposes.

Matching

Once the content 302 and web pages 310 have been analyzed 304, a matching engine 314 may be utilized to determine the relevant media programs 302 that can be inserted into the web page 310. Such matching 314 may be performed dynamically (on the fly) in real time based on the information stored in the database 306.

Various different types of matching algorithms may be utilized to determine the relevant media content 316 to provide to the internet portal 312. Apart from the metadata that has been extracted, the freshness of the media content and popularity (e.g., measured in terms of the user viewing history) can be valuable for ranking the relevant media contents. A basic matching determination may rely on the number of times a particular text is mentioned in the media content 302 and web page 310. Thus, the frequency with which a particular image, text, etc. is included in the web page 310 is used to filter/determine a match in the media content (e.g., which may also rely on the frequency with which a term/image is found). For example, if a web page contains four (4) references to Peter (e.g., in text or images), media content 302 that includes Peter numerous times may be retrieved. The database 306 may store media content 302 (e.g., video, text, documents, etc.) based on name (or indexed by name in a relational database).

When basing matching on frequency, numerous matching media content 302 may be found for a particular web page 310. For example, if a web page contains numerous references to "Peter" or to "tennis", all media content 304 containing "Peter" or "tennis" may be retrieved as potential matches. The next issue that arises is determining which match should be delivered 316 to the internet portal 312. To make such a determination, the resulting list of potential matches may be ranked/sorted. Various different types of sorting algorithms may be utilized. In a basic sorting system, the list is sorted based on the number of occurrences/times the keyword (e.g., "Peter" or "tennis") occurs in the media content 302. Thus, the more frequent a keyword (i.e. a particular name, event, location, etc.) is found in the media content, the higher priority that particular media content 304 is placed in the list.

Additionally, the potential matches list (or the determination of whether a match exists) may be sorted temporally. In other words, the most recent media content 302 is given a higher ranking compared to that of older media content 302. The date/time stamp of the media content 302 may be used. Alternatively, information such as the date the media content 302 was produced, released, etc. may be used for the temporal analysis/sorting.

A third basis/property that may be used in the sorting (or when determining a match) is the content type. If the type of content is the same/similar in both the media content 302 and web page 310, the media content 302 may have a higher ranking/priority. For example, assume that the name "Peter" has been found numerous times in both the media content 302 and web page 310. The list of potential matches for the web page 310 would include the media content 302 having the name "Peter" repeated four (4) times. However, when sorting the list, if the media content 302 is categorized as political content while the web page 310 is categorized as entertainment content, then they may not be found to match or the media content 310 may not receive a high ranking in the sorted list of potential matches. Alternatively, if both the media content 302 and web page 310 include "sports" content or "science" content, the media content 302 may receive a higher ranking in the sorted list of potential matches. The popularity of the media content can be considered, e.g. by a linear combination method with the obtained ranking results, to further improve the result.

Once the list is sorted, the internet portal 312 may utilize a variety of methodologies for purchasing the media content or the ability to link to the media content. Alternatively, the media content provider may utilize a variety of mechanisms to determine the amount that will be paid to include their media content in the internet portal 312. For example, the media content owner may specify a particular monetary amount to be paid for their media content 302 to be displayed in connection with internet portal 312 whenever a particular matching category is found or whenever a certain percentage of accuracy for the media content has been identified. In this regard, fuzzy logic may be utilized to associate a particular media content 302 with a particular page 310 via internet portal 312. Thus, the internet portal 312 may receive payment from a media content provider based on matching potential. Alternatively, the media content owner may receive payment from either the internet portal 312 or from advertisers having content within the media content 302 or from advertisers having advertisements on the web page 310 where the media content 302 is placed.

As part of the matching, the matching engine 314 may also consider entities from both textual and visual content and connect the entities to recognize events. For example, an image of an actress within media content 302 may be matched with text from the web crawler 308 describing the actress' death to determine the event of death. In this regard, the matching engine 314 may include both entity matching and event matching (i.e., entity relation based matching).

Logical Flow

Figure 4:
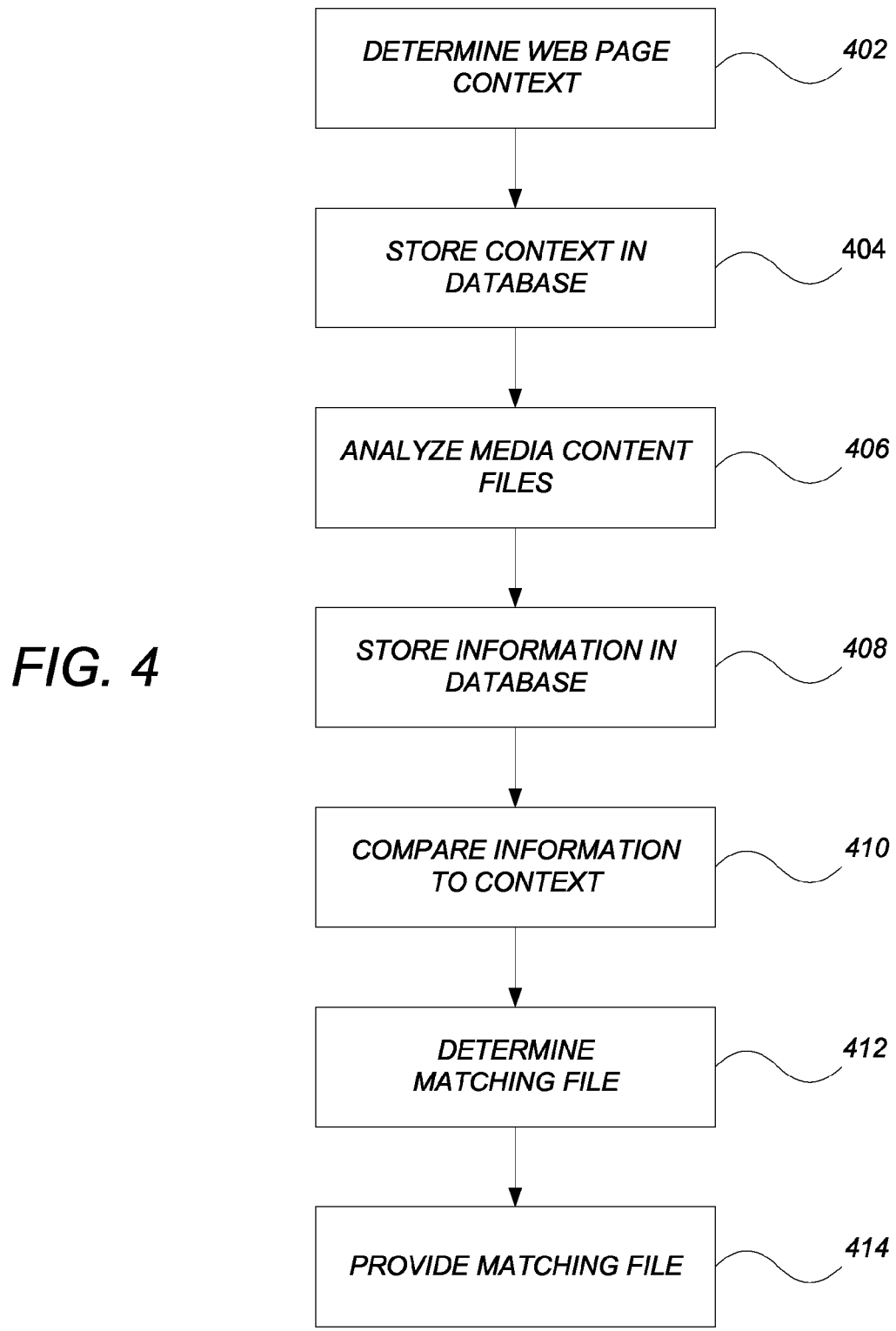
FIG. 4 is a flow chart illustrating the logical flow for providing media content (e.g., to an internet portal web site) in accordance with one or more embodiments of the invention.

FIG. 4 is a flow chart illustrating the logical flow for providing media content (e.g., to an internet portal web site) in accordance with one or more embodiments of the invention.

At step 402, a web page context is determined (e.g., using a web crawler). The web crawler may further determine if any changes have been made to the web page since a previous analysis of the web page. In addition, the web page context may be determined dynamically (on the fly) and without a request from an internet portal web site (e.g., automatically and without additional user input). The context may be determined based on metadata of the web page, a text analysis (e.g., support vector machine based text categorization), and/or image analysis.

At step 404, the web page context is stored in a database.

At step 406, one or more media content files are analyzed to extract information. The media content files may be analyzed based on closed captioning data, noisy speech recognition, and/or using a facial recognition application.

At step 408, the extracted information is stored in the database.

At step 410, the extracted information is compared to the web page context.

At step 412, a matching media content file, from the one or more media content files, that matches the web page context based on the comparing, is determined. The determining may be based on a frequency of the information compared to the web page context. In addition, the determining may include determining two or more potential matching media content files from the one or more media content files. The potential matching media content files are then sorted (e.g., by the frequency of occurrence, temporally, and/or by type of content). Based on the sorting, one of the potential matching media content files is selected (e.g., the highest ranked, first in the sorted list, etc.) as the matching media content file.

At step 414 the matching media content file is provided (e.g., to an internet portal web site via email or by supplying a link). Such a link may be automatically inserted into the web page (or internet portal) so that no additional user interaction is required. Accordingly, media content that is relevant for a particular web page is automatically determined and made available to internet users via the web page.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to determine and provide a web page with relevant media content.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for providing media content comprising:
   determining, by a content provider, when a change in web page content has been made to a web page associated with a third party since a previous analysis of the web page content at a previous time, wherein the web page includes information for an embedded media content file that is different from the web page content;
   in response to determining the change, determining a web page context for the web page content, wherein the web page context is associated with the change in the web page content since the previous analysis of the web page;
   analyzing media file content included in one or more media content files to extract information categorizing the media file content included in the one or more media content files;
   storing the information categorizing the media file content in the database;
   comparing the information categorizing the media file content from the database to the web page context;
   determining a matching media content file, from the one or more media content files, that matches the web page context based on the comparing, the matching media content file including media file content that is categorized in a category that is determined to match the web page context that is associated with the change in the web page content, wherein determining the matching media content file comprises:
      determining two or more potential matching media content files from the one or more media content files;
      sorting the two or more potential matching media content files by a frequency of the information in the two or more potential matching media content files compared to the web page context or temporally; and
      selecting one of the two or more potential matching media content files as the matching media content file based on the sorting; and
   automatically providing, by the content provider, information for the matching media content file to the web page in response to determining the change being made to the web page content, the information for the matching media content file for replacing the information for the embedded media content file in a location of the web page associated with the third party such that the matching media content file is accessible via the location of the web page.

2. The computer-implemented method of claim 1, wherein the web page context is determined using a web crawler.

3. The computer-implemented method of claim 2, wherein the web crawler determines when any changes have been made to the web page content since the previous analysis of the web page.

4. The computer-implemented method of claim 1, wherein the web page context is determined dynamically without a request from the web page or the third party.

5. The computer-implemented method of claim 1, wherein the web page context is determined based on metadata of the web page.

6. The computer-implemented method of claim 1, wherein the web page context is based on a text analysis.

7. The computer-implemented method of claim 6, wherein the text analysis comprises support vector machine based text categorization.

8. The computer-implemented method of claim 1, wherein the web page context is determined based on an image analysis.

9. The computer-implemented method of claim 1, wherein the one or more media content files are analyzed based on closed captioning data.

10. The computer-implemented method of claim 1, wherein the one or more media content files are analyzed based on noisy speech recognition.

11. The computer-implemented method of claim 1, wherein the one or more media content files are analyzed using a facial recognition application.

12. The computer-implemented method of claim 1, wherein the determining a matching media content file comprises:
   sorting the two or more potential matching media content files by a type of content of the information in the two or more potential matching media content files.

13. The computer-implemented method of claim 1, wherein the matching media content file is provided via email from a media content provider.

14. The computer-implemented method of claim 1, wherein the information comprises a link to the matching media content file.

15. A system for providing media content, the system comprising:
one or more computer processors; and
a non-transitory computer-readable storage medium comprising instructions for controlling the one or more computer processors to be configured for:
determining, by a content provider, when a change in web page content has been made to a web page associated with a third party since a previous analysis of the web page content at a previous time, wherein the web page includes information for an embedded media content file that is different from the web page content;
in response to determining the change, determining a web page context for the web page content, wherein the web page context is associated with the change in the web page content since the previous analysis of the web page;
analyzing media file content included in one or more media content files to extract information categorizing the media file content included in the one or more media content files;
storing the information categorizing the media file content in the database;
comparing the information categorizing the media file content from the database to the web page context;
determining a matching media content file, from the one or more media content files, that matches the web page context based on the comparing, the matching media content file including media file content that is categorized in a category that is determined to match the web page context that is associated with the change in the web page content, wherein determining the matching media content file comprises:
determining two or more potential matching media content files from the one or more media content files;
sorting the two or more potential matching media content files by a frequency of the information in the two or more potential matching media content files compared to the web page context or temporally; and
selecting one of the two or more potential matching media content files as the matching media content file based on the sorting; and
automatically providing, by the content provider, information for the matching media content file to the web page in response to determining the change being made to the web page content, the information for the matching media content file for replacing the information for the embedded media content file in a location of the web page associated with the third party such that the matching media content file is accessible via the location of the web page.

16. The system of claim 15, wherein the web crawler determines when any changes have been made to the web page content since the previous analysis of the web page.

17. The system of claim 15, wherein the web page context is determined dynamically without a request from the web page or the third party.

18. The system of claim 15, wherein the web page context is determined based on metadata of the web page.

19. The system of claim 15, wherein the web page context is based on a text analysis.

20. The system of claim 19, wherein the text analysis comprises support vector machine based text categorization.

21. The system of claim 15, wherein the web page context is determined based on an image analysis.

22. The system of claim 15, wherein the one or more media content files are analyzed based on closed captioning data.

23. The system of claim 15, wherein the one or more media content files are analyzed based on noisy speech recognition.

24. The system of claim 15, wherein the one or more media content files are analyzed using a facial recognition application.

25. The system of claim 15, wherein the matching engine determines a matching media content file by:
sorting the two or more potential matching media content files by a type of content of the information in the two or more potential matching media content files.

26. The system of claim 15, wherein the matching media content file is provided via email from a media content provider.

27. The system of claim 15, wherein the information comprises a link to the matching media content file.

28. A non-transitory computer readable storage medium having stored thereon instructions executed by a computer processor to cause the computer processor to be configured for:
determining, by a content provider, when a change in web page content has been made to a web page associated with a third party since a previous analysis of the web page content at a previous time, wherein the web page includes information for an embedded media content file that is different from the web page content;
in response to determining the change, determining a web page context for the web page content, wherein the web page context is associated with the change in the web page content since the previous analysis of the web page;
analyzing media file content included in one or more media content files to extract information categorizing the media file content included in the one or more media content files;
storing the information categorizing the media file content in the database;
comparing the information categorizing the media file content from the database to the web page context;
determining a matching media content file, from the one or more media content files, that matches the web page context based on the comparing, the matching media content file including media file content that is categorized in a category that is determined to match the web page context that is associated with the change in the web page content, wherein determining the matching media content file comprises:
determining two or more potential matching media content files from the one or more media content files;
sorting the two or more potential matching media content files by a frequency of the information in the two or more potential matching media content files compared to the web page context or temporally; and
selecting one of the two or more potential matching media content files as the matching media content file based on the sorting; and
automatically providing, by the content provider, information for the matching media content file to the web page in response to determining the change being made to the web page content, the information for the matching media content file for replacing the information for the embedded media content file in a location of the web page associated with the third party such that the matching media content file is accessible via the location of the web page.

* * * * *